May 22, 1956  D. S. TAYLOR  2,746,841
PRODUCTION OF BORIC ACID AND ANHYDROUS SODIUM SULFATE
Filed July 10, 1952
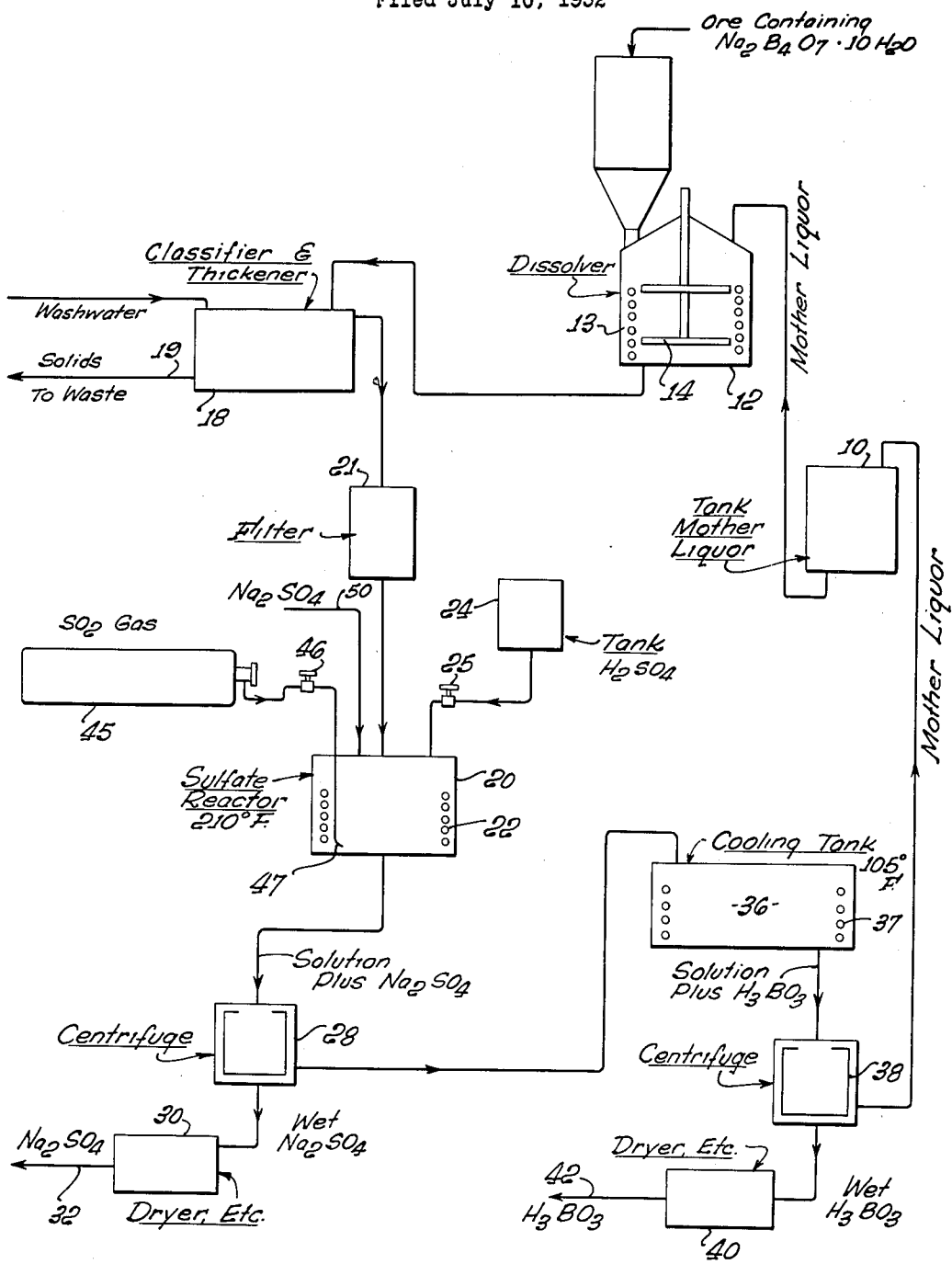
INVENTOR.
DONALD S. TAYLOR
BY
Barkelew & Scantlebury
ATTORNEYS.

United States Patent Office 2,746,841
Patented May 22, 1956

2,746,841

PRODUCTION OF BORIC ACID AND ANHYDROUS SODIUM SULFATE

Donald S. Taylor, Monrovia, Calif., assignor to Borax Consolidated, Limited, London, England, a corporation of Great Britain Application July 10, 1952, Serial No. 298,092

4 Claims. (Cl. 23—121)

This invention is concerned generally with stabilized supersaturation in certain types of chemical solutions, and, more particularly, with methods of controlling such supersaturation in the production of boric acid and anhydrous sodium sulfate.

It has been found that under certain circumstances an acid solution containing sodium or potassium sulfate in saturating concentration can be carried appreciably beyond normal saturation, for example by evaporation of water, by change of temperature, or by chemical treatment, without causing the normal amount of sulfate precipitation, and that when a suitable reducing agent is added to such a solution that sulfate supersaturation is broken and the precipitation becomes normal. Normal behavior is also restored by decreasing the acidity of the acid solution or rendering it slightly alkaline, as by the addition of sodium hydroxide to the solution. This type of supersaturation is referred to as stabilized because it continues for an appreciable period of time even when seed crystals are present in the solution. The excess of sulfate that is retained in solution depends upon conditions, but may be 4% or more of the amount normally dissolvable.

Such stabilized supersaturation is found to accompany the presence in the acid sulfate solution of a trace of a trivalent metal ion, such as ferric iron. Addition of a reducing agent to the solution in accordance with the invention is believed to transform the ferric ions to ferrous form, thus eliminating the ferric iron from the solution and terminating its effect. Instead of transforming the ferric iron to ferrous, the same result can be obtained by removing all iron from the solution, provided the method of removal is sufficiently effective. However, since only a few parts per million of ferric iron may be enough to cause stabilized sulfate supersaturation, it is usually preferable to control such supersaturation by conversion of the iron to ferrous form rather than by complete elimination of iron from the solution.

The effect can also be controlled by increasing the pH of the solution, rendering it less acid or preferably slightly alkaline. The ferric ions then become combined with hydroxyl ions and, whether they are precipitated as ferric hydroxide or remain in solution, they lose the property of inhibiting sulfate precipitation. Conversion of the ferric ions to ferric hydroxide can thus be considered to be a method of freeing the solution of ferric ions as such. It is indicated that much the same thing can be accomplished, that is, that the solution can be freed of ferric ions, by incorporation of the iron into an ionic complex, for example by addition of thiocyanate to the solution. In acid solution, irrespective of the particular acid involved, a substantial portion of the ferric ions are free, particularly in the sense of being uncombined with hydroxyl ions, and have the effect described.

Accordingly it is possible to distinguish between two classes of states in which dissolved iron can exist in a solution which is approximately saturated with sulfate. These are a sulfate precipitation inhibiting state, represented by the presence of free ferric ions, uncombined with hydroxyl, and occurring typically in acid solutions under oxidizing (or at least non-reducing) conditions; and a sulfate precipitation neutral state, represented by the absence of free ferric ions uncombined with hydroxyl, and occurring typically in alkaline solutions or in solutions under reducing conditions which transform the ferric ions to ferrous form.

The control of such supersaturation by methods that directly involve chemical change of the dissolved iron are particularly described and are claimed in my copending application, Serial No. 765,095, filed July 31, 1947, and issued May 5, 1953, as Patent 2,637,626, of which the present application is a continuation in part. The present application is concerned more particularly with methods of controlling such supersaturation by procedures that do not depend primarily for their effectiveness upon chemical transformation of the dissolved iron.

The practical importance of this invention will be appreciated, and a more complete understanding of its exact meaning will be gained, from the following detailed explanation of the invention as it is embodied in a typical illustrative chemical process. This explanation is to be read in conjunction with the accompanying drawing which illustrates in diagrammatic form the process, and the embodiment of the invention in it. For the sake of clarity, various well known details of the fundamental process, such as means for transferring material from place to place, are omitted from the drawing and description. The essentials of the process itself are described, for example, in United States Patent No. 1,950,106.

In the chemical process which has been selected for purposes of illustration, sodium sulfate and boric acid are obtained by differential precipitation from a mother liquor in which sodium borate has been dissolved from a suitable ore. As indicated in the drawing, mother liquor from tank 10 and ore containing substantially only water insoluble materials and borax ($Na_2B_4O_7 \cdot 10H_2O$) are introduced into dissolving tank 12. Solution of the soluble ore fraction is preferably hastened by warming the tank to about 130° F., as by steam coil 13, and by agitation of the mixture by means indicated at 14. The resulting borate solution is separated from the insoluble ore fraction in classifier and thickener 18 and in filter 21, and the clear solution is taken to sulfate reactor 20. The solution is heated, as by steam coils 22, and sulfuric acid is added from tank 24 under control of valve 25 in sufficient quantity to convert all $Na_2O$ in the solution to sodium sulfate, producing an acid solution which contains primarily sodium sulfate and boric acid. The acidified solution is heated to approximately 210° F. with the result that the concentration of sodium sulfate exceeds the normal solubility at the existing temperature and causes precipitation of anhydrous sodium sulfate. The precipitate is removed from the solution, as by centrifuge 28, and is washed, dried and otherwise processed as may be required at 30, and delivered as substantially pure sodium sulfate at 32.

The remaining solution, saturated with sulfate and containing boric acid in high, but not quite saturating, concentration, is taken from centrifuge 28 to cooling tank 36, in which the temperature is lowered to about 105° F. by any suitable means, such as cold water coil 37 or evaporation of water from the solution. This increases the solubility of sulfate, which has an inverted temperature solubility curve in the temperature range under consideration, so that no sulfate is precipitated. But the boric acid solubility is reduced by the lowered temperature, causing boric acid to crystallize out of solution in the cooling tank. The resulting crystals are removed, as by centrifuge 38, and boric acid is washed and dried at 40 and delivered at 42. The remaining solution, which still contains sulfate and boric acid in sufficiently high concentrations to produce saturation at 210° and 105° F. respectively, is returned as mother liquor from centrifuge 38 to storage tank 10, and is available for use in a succeeding cycle.

In the operation of the process just described, it has been found that less than the theoretical amount of sodium sulfate is sometimes precipitated in sulfate reactor 20, leading to unbalanced conditions and unsatisfactory operation of the system. In extreme cases the effective yield of sodium sulfate during a cycle is reduced to as little as 20% of the theoretical yield. This condition, which has been found to be produced by the presence of even a trace of free ferric iron in solution, may be corrected, for example, by introducing into the solution a suitable reducing agent capable of reducing ferric iron to ferrous form, as is described and claimed in the above identified copending application. For example, sulfur dioxide gas may be introduced directly via line 47 into the solution in sulfate reactor 20 from a gas cylinder, indicated at 45, the flow of gas being regulated by valve means shown schematically at 46. Sulfur dioxide is absorbed by the solution and reacts with water to form sulfurous acid, the sulfite radical acting as a reducing agent for dissolved iron. Reduction of dissolved iron to ferrous form terminates the tendency toward supersaturation, and restores normal operation of the system.

The oxidation of ferrous iron to ferric form can also be put to positive use in a process of the type described. For example, in each cycle through which the mother liquor is passed from tank 10 back to tank 10, the iron content of the solution can be changed to ferrous (or to ferric hydroxide) form at or ahead of sulfate reactor 20 to insure complete normal sulfate precipitation; and then changed to ferric form (uncombined with hydroxyl) at or ahead of cooling tank 36 to inhibit precipitation of sulfate during the step of boric acid precipitation. If insufficient iron is present in the solution as natural impurity, additional iron can be introduced. Such a double transformation procedure is not ordinarily necessary in a properly designed process for the differential precipitation of substances which have distinctly different temperature solubility curves, but it has the advantage of minimizing the possibility of sulfate contamination of the other chemical precipitated, for example if the balance of the system should become temporarily disturbed. This advantage tends to be more important the more nearly similar are the temperature solubility curves of the materials treated.

If it is preferred for any reason not to remove or transform the iron content of the solution, the effect of the ferric iron which is present can be minimized by carrying out the steps of acidification and sulfate precipitation in such a way that a large amount of precipitate is formed before the solution actually becomes acid. This can be accomplished, for example, by raising the temperature to approximately 210° F. before the whole amount of required acid has been added. A portion of the acid required to transform all dissolved $Na_2O$ to sulfate may be added while the solution is still cool, acidification being interrupted before the solution becomes acid. The solution is then heated, reducing the sulfate solubility and precipitating the excess sulfate while the ferric iron in the solution is still in the form of ferric hydroxide. The remainder of the required acid is then added, completing transformation of the dissolved borate and producing additional sulfate precipitation from the resulting acid solution. By this procedure any effect of uncombined ferric ions is limited to the second relatively small portion of sulfate precipitated.

Alternatively, the acid may be added continuously (but preferably slowly) rather than intermittently, the solution being heated either before or during the acidification and brought to approximately 210° F. before the solution becomes acid.

Another method of obtaining heavy precipitation while the solution is still alkaline is to bring the sulfate concentration substantially to saturation, as by addition of sodium sulfate to the solution, prior to acidification and preferably while the solution is still relatively cool. Under those conditions an appreciable quantity of additional sulfate can be dissolved. Then, when the solution is heated and acidified, sulfate saturation is attained relatively quickly, and an increased amount of sulfate is precipitated before the solution becomes acid. The total amount of sulfate precipitated is also increased by this procedure, equaling the normal (or net) precipitate plus the amount of sulfate that was added. This increased precipitation, by a kind of mass action, appears to overcome in large part the tendency of any dissolved ferric iron to stabilize sulfate supersaturation, with the result that the net amount of sulfate precipitated is increased and approaches the net yield that would be obtained in absence of ferric ion.

Such addition of sodium sulfate to the solution is made, in the particular system here described for illustration, at or ahead of sulfate reactor 20, and is made before the solution has been fully heated and before completion of the step of acidification. The added sulfate is effective only to the extent that it goes into solution. Hence the preferred procedure is to perform such addition and solution under conditions to produce substantial saturation at a temperature close to but above the transition temperature for sodium sulfate, at which the sulfate solubility is effectively a maximum; and before any appreciable amount of acid has been added. For example, the sodium sulfate may be added at sulfate reactor 20, as indicated schematically in the drawing by the arrow 50, and before the start of heating or acidification, the solution then being typically at a temperature such as 120° F. The amount of sulfate added is preferably at least sufficient to produce substantial saturation under the existing conditions. That typically requires an amount of $Na_2SO_4$ from 2 to 4% of the weight of the solution, although as much as 10% may be added.

By exercising suitable precautions in withdrawing the solution and sulfate precipitate from sulfate reactor 20 after the step of sulfate precipitation, a suitable quantity of the sulfate precipitate may be caused to remain in reactor 20. That sulfate is then added to the fresh charge of solution as it is admitted from filter 21, and dissolves in that fresh charge of solution. Sulfate added to the fresh solution in that way may function in the same manner, and may be as effective in carrying out the invention, as sulfate obtained, for example, from the output 32 from dryer 30 and transferred into reactor 20 along with the fresh charge of solution. Both of those detailed operations have the result of adding sulfate directly to the borate solution, and are included within the scope of the present invention.

Under typical operation of the described system, the borate solution that enters sulfate reactor 20 may include, for example, approximately 2.6% $Na_2O$, 10.4% $B_2O_3$, 22.4% $Na_2SO_4$ and 0.01% Fe, at a temperature of about 120° F. After treatment with sulfuric acid, such a solution contains potentially approximately 18.5% $H_3BO_3$ and 28.0% $Na_2SO_4$. At 210° F. the equilibrium solubility of $Na_2SO_4$ in such a solution is found to be about 26.4%. Yet, when acidification and sulfate precipitation are carried out in a manner closely approximating conventional plant operation and in the presence of free ferric ion, it is found that about 27.8% $Na_2SO_4$ typically remains in solution, representing an excess of about 5% of the true solubility. Under such conditions the sulfate actually precipitated may be relatively slight, typically only 0.2% of the weight of the solution.

When, in accordance with one aspect of this invention, sodium sulfate is added directly to the solution in saturating concentration before heating and before acidification, it is found that after heating and acidification there is a very considerable precipitation of anhydrous sulfate, typically as much as 3% of the weight of the solution, and that the sulfate concentration in the resulting solution is reduced typically to about 27.0%, representing a considerable reduction in the excess over equilibrium solubility.

That excess may be further reduced by combining direct sulfate addition to the solution with the described procedure of carrying out the acidification in two steps. For example, additional sulfate may first be added to saturate the solution at a temperature of about 120° F. A first portion of sulfuric acid, preferably comprising about three quarters of that required to react all the sodium borate in solution, may then be added, preferably at the same lower temperature at which the sulfate was added. The solution is then heated, typically to about 210° F. That first portion of acid, under typical conditions, does not render the solution sufficiently acid to transform any appreciable amount of ferric hydroxide to free ferric ions. Hence sulfate produced by that portion of acid, and also the sulfate that was added directly to the solution, can be precipitated in anhydrous form without inhibition, even in the presence of ferric iron. That first sulfate precipitation leads to a relatively heavy sulfate precipitate, which is retained as a suspension in the solution, offering a relatively large surface area of freshly grown anhydrous crystalline sodium sulfate. That crystal surface is considerably larger, due to the combined action of the sulfate added directly to the solution and that produced by the first portion of acid, than it would be if only one of those factors were present.

After formation of that increased first sulfate precipitate at a relatively elevated temperature, a second portion of sulfuric acid is added, sufficient to transform the remaining sodium borate into boric acid and sodium sulfate. That second portion of acid typically comprises about one quarter of the entire charge of acid. That renders the solution more acid, and ferric hydroxide may thereby be transformed in appreciable quantity into free ferric ions, in which form it would ordinarily inhibit the further precipitation of anhydrous sodium sulfate from the solution. However, the heavy sulfate precipitate that has been freshly formed in the solution, as a result of the described combination of steps, has been found to facilitate further sulfate precipitation. For example, with the illustrative procedure just described, the sulfate content of the resulting solution, following the final sulfate precipitation, has been found to be as low as 26.6%, representing an excess of less than 1% of the equilibrium solubility. The effect of the first-formed sulfate precipitate in facilitating formation of the final sulfate precipitate is quite distinct from any effect obtainable by conventional seeding of the solution. Seeding of the solution with already formed crystals is found to be virtually ineffective, whereas actual formation in the solution of a heavy first precipitate produces the result that has been described.

It will be understood that many variations may be made in the particular system here selected for purposes of illustration, and in the manner of operating it, without departing from the scope of the invention, which is defined in the appended claims.

I claim:

1. In a process for producing anhydrous sodium sulfate and boric acid from a solution containing sodium borate and also containing dissolved iron in sufficient concentration to stabilize supersaturation with respect to anhydrous sodium sulfate, said process comprising treatment of the solution with sulfuric acid to transform the sodium borate to boric acid and sodium sulfate, precipitating anhydrous sodium sulfate from the solution at a relatively elevated temperature, removing the precipitate, then precipitating boric acid from the solution at a relatively lower temperature, and removing the precipitated boric acid; the improvement which comprises adding sodium sulfate as such to the said sodium borate solution before the said acid treatment and at a temperature appreciably lower than the said elevated temperature and in a quantity to substantially saturate the solution with sodium sulfate at that lower temperature, then introducing into the solution a first amount of sulfuric acid sufficient to transform only approximately three quarters of the whole of the dissolved sodium borate to boric acid and sodium sulfate, then heating the partially acidified solution to the said elevated temperature of sulfate precipitation, thereby precipitating from the solution a first quantity of anhydrous sodium sulfate corresponding to the sulfate formed by the said first amount of sulfuric acid and the sulfate added as such to the solution, then introducing into the resulting solution at the said elevated temperature an additional amount of sulfuric acid sufficient to transform the remainder of the dissolved sodium borate to boric acid and sodium sulfate, thereby precipitating a second quantity of sodium sulfate produced by the additional sulfuric acid, all whereby the precipitation of the first quantity of sulfate from less acid solution reduces the tendency of free ferric ions to inhibit the precipitation of the second quantity of anhydrous sodium sulfate from more acid solution.

2. In a method for producing anhydrous sodium sulfate and boric acid from a solution containing sodium borate and containing iron in sufficient quantity, when in the form of free ferric ion, to cause the sulfate to be held in solution, against precipitation in anhydrous form, in a greater than normal saturated concentration, said method comprising adding sulfuric acid to the solution to form boric acid and sodium sulfate, precipitating anhydrous sodium sulfate from the solution at a relatively elevated temperature, removing the precipitated sodium sulfate, precipitating boric acid from the resulting solution at a relatively lower temperature, and removing the precipitated boric acid; the improvement which comprises adding sodium sulfate in solid form to the sodium borate solution before completion of the said treatment with sulfuric acid and at a temperature appreciably lower than the said elevated temperature and while the solution is still unsaturated with respect to anhydrous sodium sulfate, the said solid sodium sulfate dissolving in the solution in a quantity to substantially saturate the solution with respect to anhydrous sodium sulfate at that lower temperature, then completing the said treatment with sulfuric acid and raising the temperature of the solution to the said elevated temperature, thereby precipitating a quantity of anhydrous sodium sulfate corresponding to the sum of the sodium sulfate dissolved from solid form and the sodium sulfate formed in solution by the said acid treatment.

3. In a cyclic process for producing anhydrous sodium sulfate and boric acid, which process includes the steps of dissolving sodium borate in a mother liquor, adding sulfuric acid to the resulting solution to form sodium sulfate and boric acid, precipitating anhydrous sodium sulfate at a relatively elevated temperature, removing the precipitated sodium sulfate, precipitating boric acid from the resulting solution at a relatively lower temperature, and returning the remaining solution as mother liquor to repeat the cycle; the method of carrying the step of anhydrous sodium sulfate precipitation to substantial completion in the presence of a substance tending to stabilize supersaturation of anhydrous sodium sulfate, said method comprising dissolving solid sodium sulfate in the recycled mother liquor after the step of removing the boric acid precipitated during one cycle and before completion of the said treatment with sulfuric acid during the subsequent cycle and at a temperature appreciably lower than the said elevated temperature, then completing the said treatment with sulfuric acid and raising the temperature of the solution to the said elevated temperature, thereby precipitating a quantity of anhydrous sodium sulfate corresponding to the sum of the sodium sulfate dissolved from solid form and the sodium sulfate formed in solution by the said acid treatment.

4. In a cyclic process for producing anhydrous sodium sulfate and boric acid, which process includes the steps of dissolving sodium borate in a mother liquor, adding sulfuric acid to the resulting solution to form sodium sulfate and boric acid, precipitating anhydrous sodium sulfate at a relatively elevated temperature, removing the precipitated sodium sulfate, precipitating boric acid from the resulting solution at a relatively lower temperature, and returning the remaining solution as mother liquor to repeat the cycle; the method of carrying the step of anhydrous sodium sulfate precipitation to substantial completion in the presence of a substance tending to stabilize supersaturation of anhydrous sodium sulfate, said method comprising dissolving solid sodium sulfate in the recycled mother liquor after the step of removing the boric acid precipitated during one cycle and before the said treatment with sulfuric acid during the subsequent cycle and at a temperature appreciably lower than the said elevated temperature, then adding sulfuric acid and raising the temperature of the solution to the said elevated temperature, thereby precipitating a quantity of anhydrous sodium sulfate corresponding to the sum of the sodium sulfate dissolved from solid form and the sodium sulfate formed in solution by the said acid treatment.

References Cited in the file of this patent

UNITED STATES PATENTS

| | | |
|---|---|---|
| 770,963 | Gilman | Sept. 27, 1904 |
| 1,950,106 | Franke | Mar. 6, 1934 |
| 2,089,557 | Jacobi | Aug. 10, 1937 |
| 2,104,009 | Burke | Jan. 4, 1938 |
| 2,113,248 | Berg | Apr. 5, 1938 |
| 2,545,746 | O'Brien | Mar. 20, 1951 |

OTHER REFERENCES

Cummings: "Hydrochloric Acid and Saltcake," vol. 5, Von Nostrand Co., N. Y., 1923, page 219.